(12) United States Patent
Carballo et al.

(10) Patent No.: US 11,759,052 B2
(45) Date of Patent: Sep. 19, 2023

(54) MOVABLE RACK ASSEMBLY FOR A WOOD BURNING GRILL

(71) Applicant: Haier US Appliance Solutions, Inc., Wilmington, DE (US)

(72) Inventors: Daniel Carballo, Louisville, KY (US); Eric Matthew Lewis, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 148 days.

(21) Appl. No.: 17/173,266

(22) Filed: Feb. 11, 2021

(65) Prior Publication Data

US 2022/0248904 A1  Aug. 11, 2022

(51) Int. Cl.
*A47J 37/07* (2006.01)
*F16H 37/12* (2006.01)

(52) U.S. Cl.
CPC ....... *A47J 37/0786* (2013.01); *A47J 37/0704* (2013.01); *F16H 37/122* (2013.01); *A47J 2037/0795* (2013.01); *F16H 2702/00* (2013.01)

(58) Field of Classification Search
CPC .............. A47J 37/0786; A47J 37/0704; A47J 2037/0795; F16H 37/122; F16H 2702/00
See application file for complete search history.

(56) References Cited

U.S. PATENT DOCUMENTS

| RE9,080 E | * | 2/1880 | Stoll | 366/292 |
| 1,533,256 A | * | 4/1925 | Mccaul | F24C 15/16 211/153 |
| 3,297,016 A | * | 1/1967 | Rhodes | A47J 37/0763 126/25 A |
| 3,405,562 A | | 10/1968 | Brandt | |
| 5,458,053 A | | 10/1995 | Hsiao | |
| 5,657,667 A | * | 8/1997 | Noga | B60K 23/08 74/335 |
| 9,277,840 B2 | | 3/2016 | Ikeda | |
| 2002/0011748 A1 | * | 1/2002 | Ito | B60N 2/2213 297/362 |

(Continued)

FOREIGN PATENT DOCUMENTS

| EP | 1557547 A2 | * | 7/2005 | ........... F02D 9/1065 |
| GB | 2471110 A | * | 12/2010 | .......... A47J 37/0704 |

(Continued)

*Primary Examiner* — Jorge A Pereiro
*Assistant Examiner* — Logan P Jones
(74) *Attorney, Agent, or Firm* — Dority & Manning, P.A.

(57) ABSTRACT

A movable rack assembly may include an input shaft, a driven gear, an adjustable rack, an interference plate, and a contact tab. The input shaft may extend along an input axis. The input shaft may include a worm gear segment disposed along the input axis between a first end and a second end. The driven gear may be enmeshed with the worm gear segment, define a maximum outer circumference, and be rotatable about a driven axis nonparallel to the input axis. The interference plate may be fixed to the driven gear. The interference plate may include a radial arm extending past the maximum outer circumference of the driven gear. The contact tab may extend from the input shaft and be axially offset from the worm gear segment in selective engagement with the radial arm at a predefined travel limit of the driven gear to halt rotation at the input shaft.

20 Claims, 7 Drawing Sheets

(56) References Cited

U.S. PATENT DOCUMENTS

2016/0360925 A1* 12/2016 Chun .................. A47J 37/0704
2019/0231144 A1* 8/2019 Cook .................. A47J 37/0704

FOREIGN PATENT DOCUMENTS

| JP | 6145093 B2 | | 6/2017 |
| --- | --- | --- | --- |
| KR | 101419282 B1 | * | 7/2014 |
| KR | 101435748 B1 | | 8/2014 |
| KR | 101700181 B1 | * | 2/2017 |

* cited by examiner

MOVABLE RACK ASSEMBLY FOR A WOOD BURNING GRILL

FIELD OF THE INVENTION

The present subject matter relates generally to height-adjustable rack assemblies, such as may be used with a hand-cranked movable rack assembly for a wood burning grill.

BACKGROUND OF THE INVENTION

Various use cases exist wherein a rack assembly that could be adjusted (e.g., raised and lowered) would be useful, such as in the context of a grill. Conventional grills include an enclosed base or bottom pan that receives charcoal and that supports a cooking rack or grate for receiving the food items to be cooked. However, conventional grills include a cooking rack that has a fixed vertical position or racks that may only be moved between fixed locations when the grill is cold. As a result, food items being cooked may often be positioned too close or too far from the bed of coals or burning wood, resulting in overcooking or undercooking, respectively. Moreover, once the wood or charcoal is completely consumed in a conventional grill, it is typically very difficult to remove the hot rack and food items to add more wood or charcoal. As a result, conventional grills must typically be loaded with enough wood or charcoal at the beginning of a cooking process to complete the entire cooking process before being consumed.

Although height-adjustable assemblies have been used for certain systems or grills, they can present a number of drawbacks. As an example, it can be difficult to appropriately limit the height adjustments made by a rack assembly. This can be especially true in the context of hand-powered adjustable assemblies that have to rely on a user to know when a rack assembly has achieved its maximum or minimum height. Some assemblies attempt to address this by mounting physical stops or barriers at predetermined maximum and minimum heights to contact the movable rack from above or below. Unfortunately, though, users may have trouble discerning that the movable rack has hit a physical stop. The contact between the physical stop and rack assembly may feel gradual or dull to a user. It is thus possible that a user may continue to try moving the rack assembly up or down, which naturally places strain on the various portions of the rack assembly. If a relatively high gearing has been provided to magnify the user's input force, the risks for damage are obviously greater.

As a result, improved movable rack assemblies would be desirable. In particular, it would be advantageous to provide a rack assembly capable of reliably limiting movement of the rack assembly while reducing the risk of damage to the assembly. Additionally or alternatively, a rack assembly capable of providing reliable or easily-discernable physical feedback as to when the rack assembly has reached a maximum or minimum height.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a movable rack assembly is provided. The movable rack assembly may include an input shaft, a driven gear, an adjustable rack, an interference plate, and a contact tab. The input shaft may extend along an input axis to rotate thereabout. The input shaft may include a worm gear segment disposed along the input axis between a first end and a second end. The driven gear may be enmeshed with the worm gear segment. The driven gear may define a maximum outer circumference and be rotatable about a driven axis nonparallel to the input axis. The adjustable rack may be in mechanical communication with the driven gear to move therewith. The interference plate may be fixed to the driven gear to rotate therewith about the driven axis. The interference plate may include a radial arm extending past the maximum outer circumference of the driven gear. The contact tab may extend from the input shaft to rotate therewith about the input axis, the contact tab being axially offset from the worm gear segment in selective engagement with the radial arm at a predefined travel limit of the driven gear to halt rotation at the input shaft.

In another exemplary aspect of the present disclosure, a movable rack assembly for a wood burning grill is provided. The movable rack assembly may include an input shaft, a hand wheel, a driven gear, an adjustable rack, an interference plate, and a contact tab. The input shaft may extend along an input axis to rotate thereabout. The input shaft may include a worm gear segment disposed along the input axis between a first end and a second end. The hand wheel may be rotationally fixed to the input shaft to rotate therewith about the input axis. The driven gear may be enmeshed with the worm gear segment. The driven gear may define a maximum outer circumference and be rotatable about a driven axis nonparallel to the input axis. The adjustable rack may be in mechanical communication with the driven gear to move therewith. The interference plate may be fixed to the driven gear to rotate therewith about the driven axis. The interference plate may include a radial arm may extend past the maximum outer circumference of the driven gear. The contact tab may extend from the input shaft to rotate therewith about the input axis. The contact tab may be axially offset from the worm gear segment in selective engagement with the radial arm at a predefined travel limit of the driven gear to halt rotation at the input shaft. The worm gear segment and the driven gear may define a gearing ratio of the worm gear segment to the driven gear greater than 1:1.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
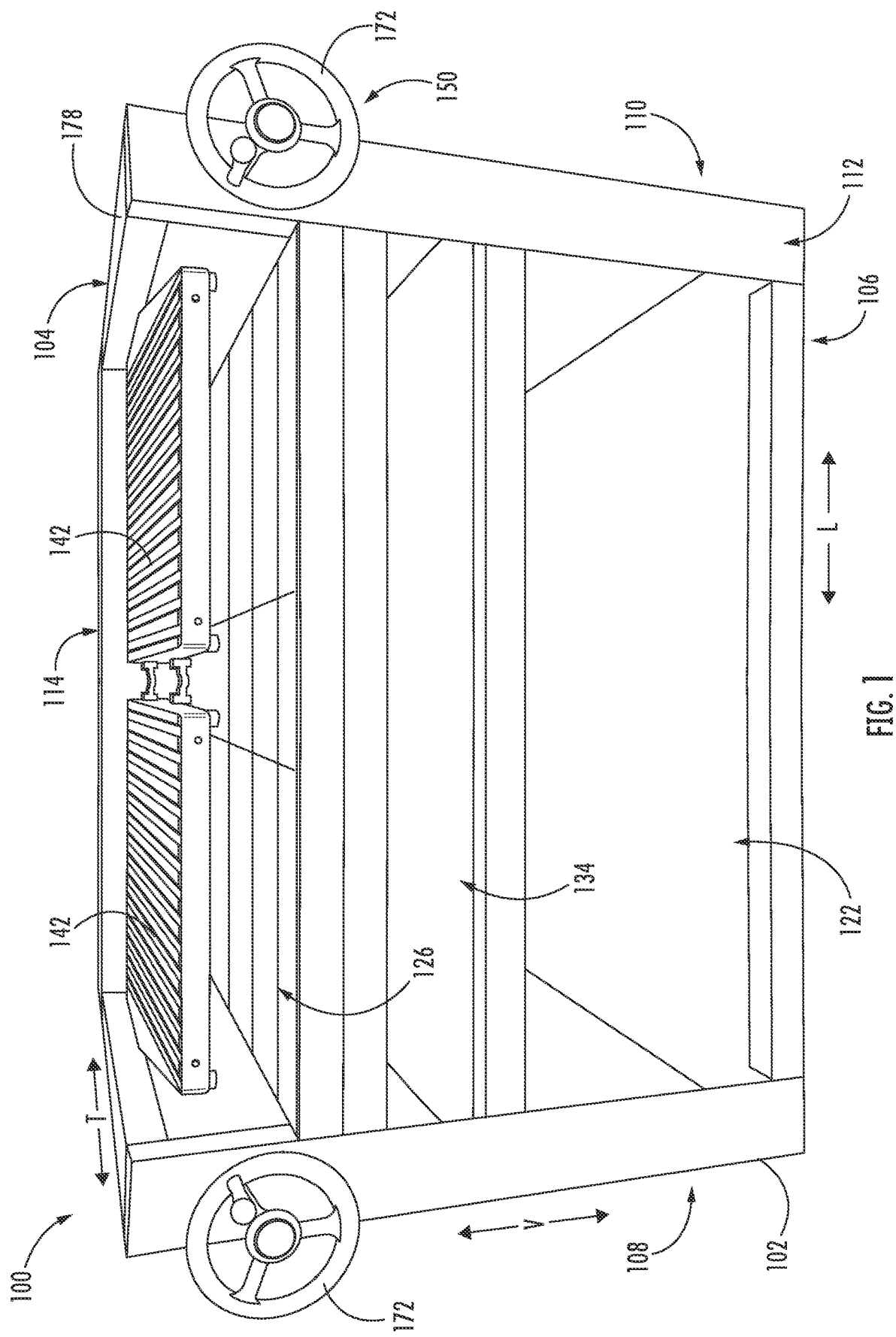
FIG. 1 provides a front perspective view of a wood burning grill according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The phrase "in one embodiment," does not necessarily refer to the same embodiment, although it may. The terms "first," "second," and "third" may be used interchangeably to distinguish one component from another and are not intended to signify location or importance of the individual components. Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
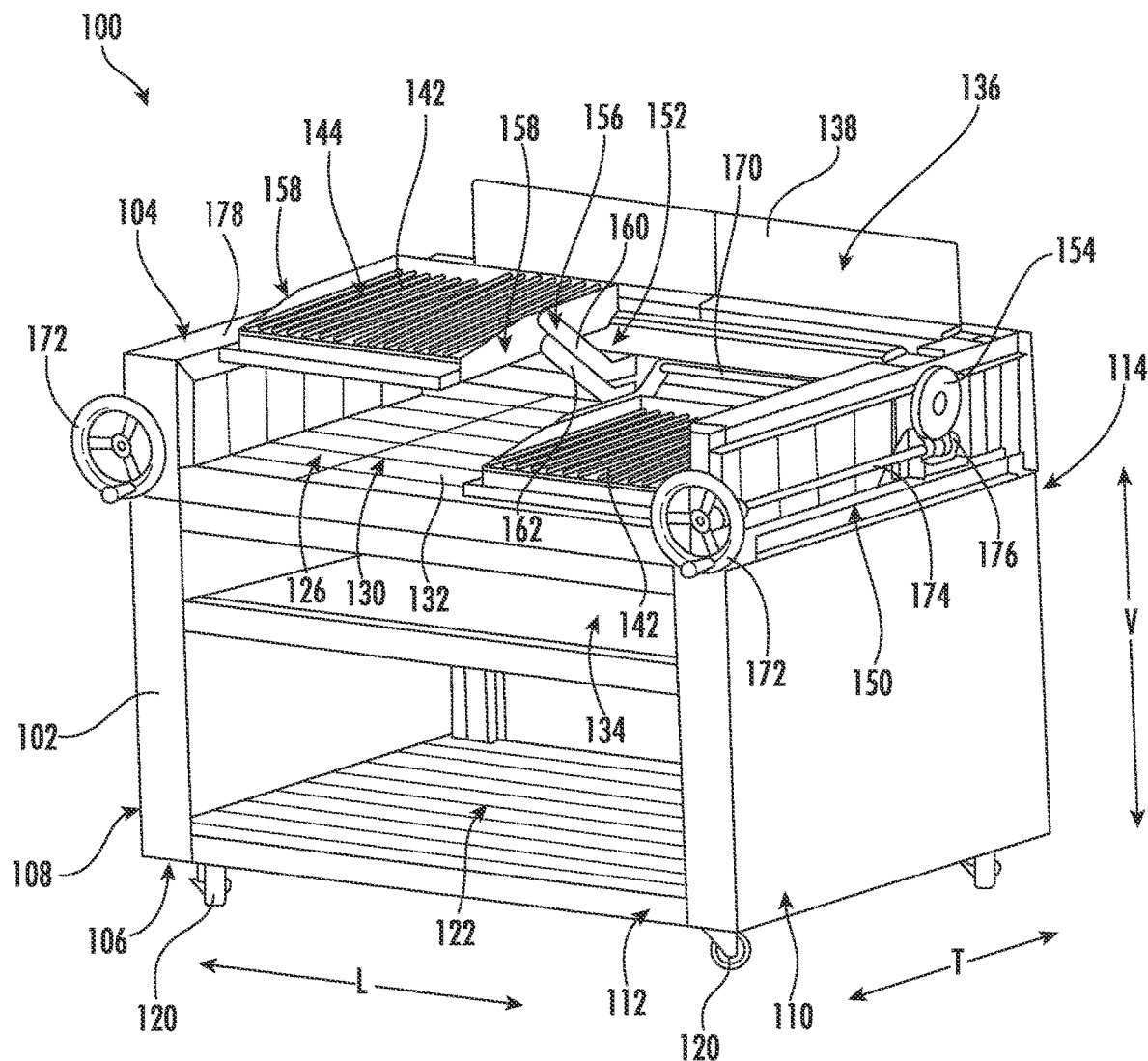
FIG. 2 provides another perspective view of the exemplary wood burning grill of FIG. 1.
Figure 3:
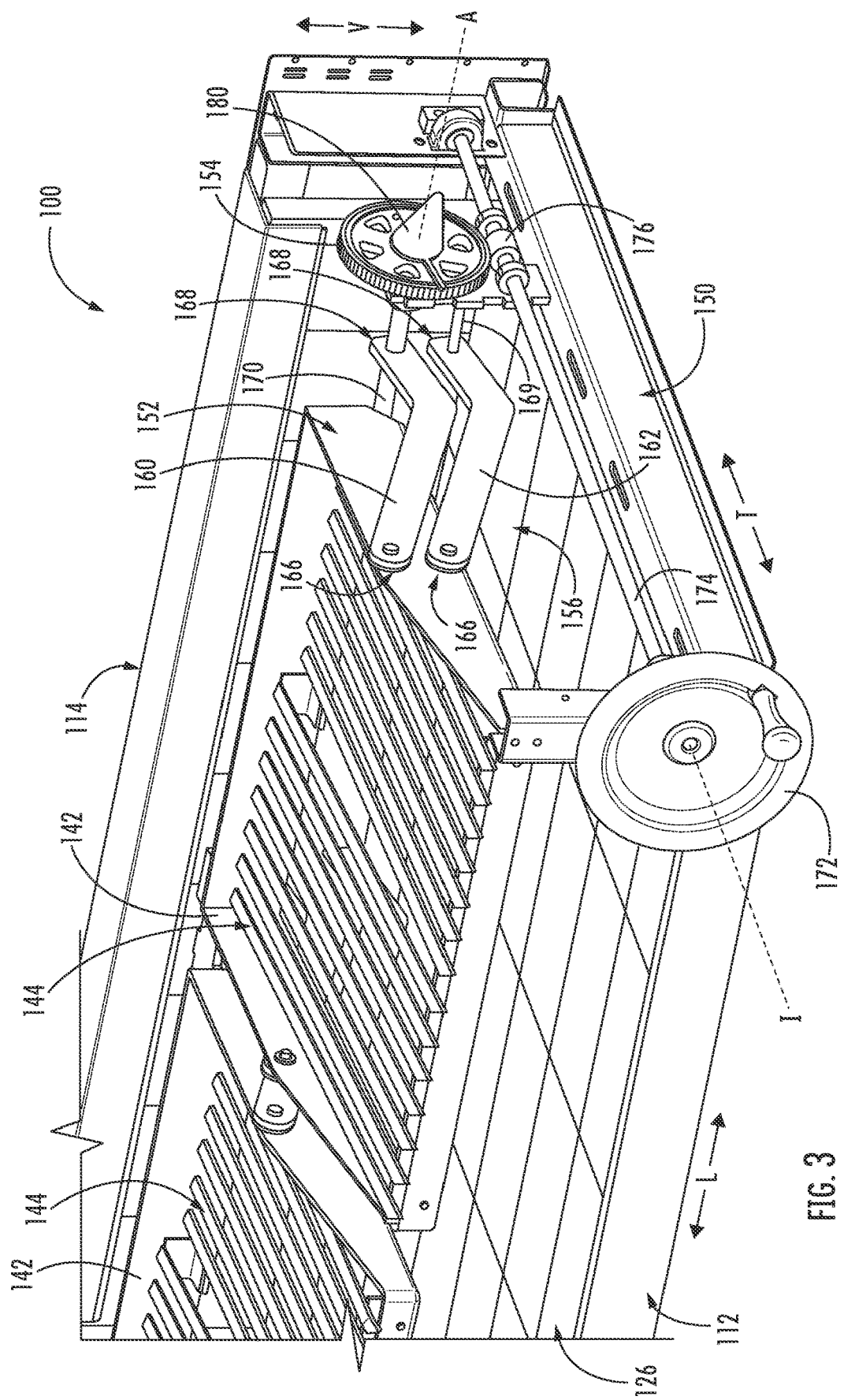
FIG. 3 provides a magnified perspective view of a portion of the exemplary wood burning grill of FIG. 1, wherein various portions have been removed for clarity.
Figure 4:
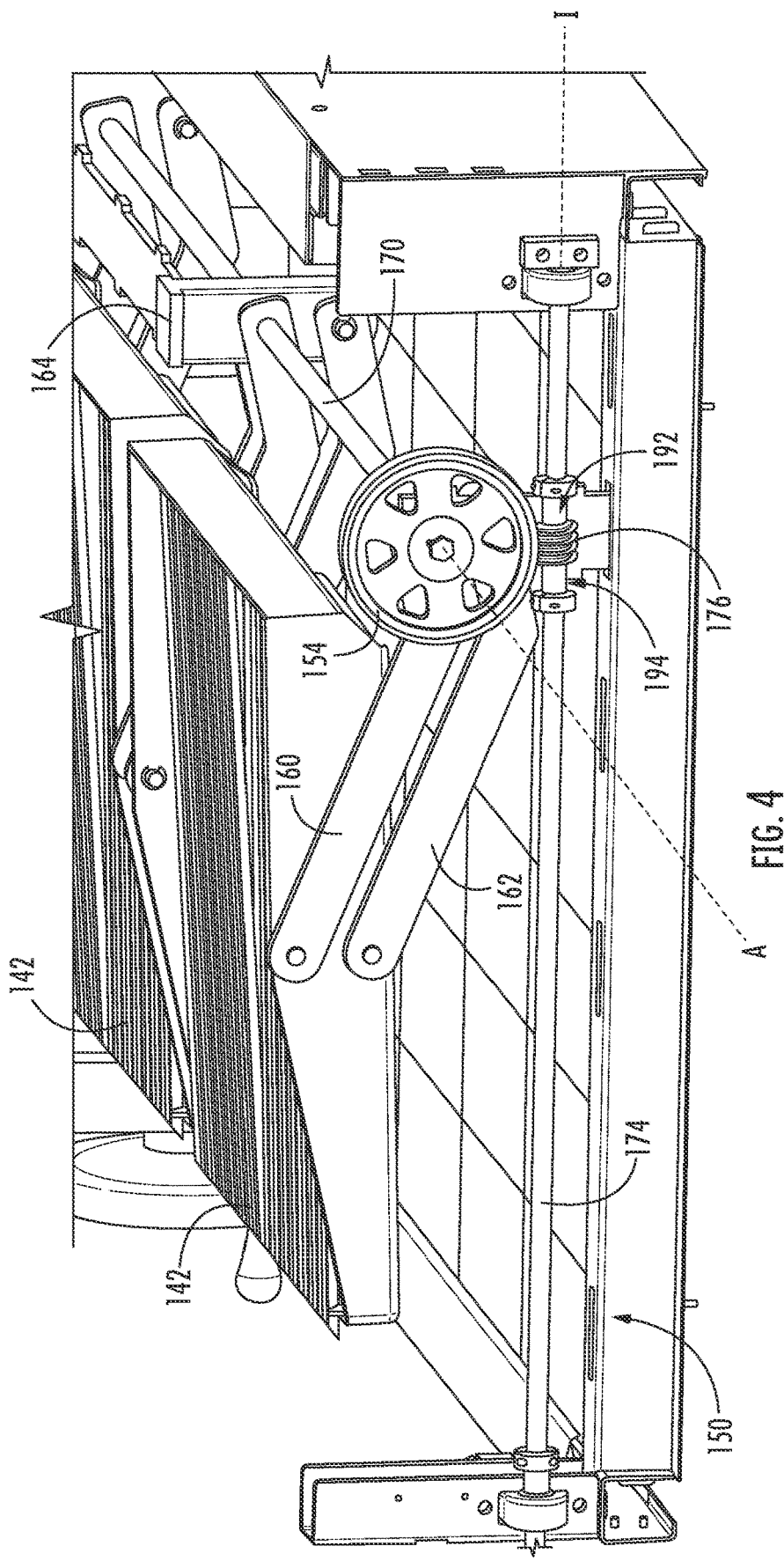
FIG. 4 provides another magnified perspective view of a portion of the exemplary wood burning grill of FIG. 1, wherein various portions have been removed for clarity.

Turning to the figures, FIGS. 1 and 2 provide various perspective views of a wood burning grill 100 according to exemplary embodiments of the present disclosure. Wood burning grill 100 generally defines a vertical direction V, a lateral direction L, and a transverse direction T, each of which is mutually perpendicular, such that an orthogonal coordinate system is generally defined. Wood burning grill 100 can include a chassis or cabinet 102 that extends along the vertical direction V between a top portion 104 and a bottom portion 106, along the lateral direction L between a left side portion 108 and a right side portion 110, and along the traverse direction T between a front portion 112 and a rear portion 114.

Optionally, cabinet 102 may be positioned on casters or wheels 120 (e.g., to facilitate easy movement of wood burning grill 100). In addition, cabinet 102 of wood burning grill 100 may define one or more lower storage compartments 122. Storage compartment 122 may be used for storing cooking utensils, pots, pans, grill tools, or any other suitable items. According to the illustrated embodiment, storage compartment 122 may be used to store wood, such as wood logs or wood chunks, that may be periodically added to the firebox (described below) to facilitate the grilling process. Although the present disclosure illustrates and describes the use of wood logs for burning to facilitate a cooking process, it should be appreciated that any other suitable type or size of combustible material may be used. For example, wood chunks, wood chips, wood pellets, or any other suitable material may be used.

As illustrated, cabinet 102 may further define a coal support platform 126 that is positioned proximate to top 104 of cabinet 102. As will be described in more detail below, coal support platform 126 is generally configured for supporting charcoal, wood embers, or other wood fuel (e.g., identified herein generally as charcoal or coals) for facilitating a cooking process. As used herein, the terms "charcoal," "coals," and the like are generally intended to refer to any combustible source or byproduct that is intended to facilitate cooking of one or more items. For example, according to an exemplary embodiment, coals refer to the wood or wood byproducts that burn off from or separate from one or more burning logs (e.g., wood), such as embers or other heated or burning wood products. Notably, the coals may burn cleaner than the wood logs, as volatile organic carbons (VOCs) have mostly burned away from the wood logs.

According to the illustrated embodiment, coal support platform 126 may be positioned at a top of cabinet 102 and may be defined by or covered by an insulative material 130. For example, according to the illustrated embodiment, the insulative material 130 is fire brick 132. Specifically, fire brick 132 may be positioned on top 104 of cabinet 102 to define a flat surface (e.g., coal support platform 126) for supporting coals. In addition, according to the illustrated embodiment, coal support platform 126 is slightly recessed from top 104 of cabinet 102, and the sides (e.g., left side 108 and right side 110) and back (e.g., rear 114) may be raised to partially define a coal chamber that retains heat, blocks wind, etc.

As used herein, the term insulative material, fire brick, or the like is generally intended to refer to any material that is suitably rigid and capable of withstanding high temperature from burning coals. In this regard, for example, the fire brick may be one or more blocks of ceramic material positioned adjacent to each other to form the coal bed. These fire bricks are capable of withstanding very high temperatures and may also be insulative or have a relatively low thermal conductivity, such that thermal energy from the coals is not wasted through the fire brick 132 and is instead focused on the food items being cooked.

According to the illustrated embodiment, cabinet 102 may further define a secondary storage compartment, which may also be used as a warming compartment 134. In this regard, warming compartment 134 is an open compartment defined in cabinet 102 that is positioned between storage compartment 122 and coal support platform 126. Notably, residual heat from coals may heat warming compartment 134. According to exemplary embodiments of the present subject matter, warming compartment 134 may also be surrounded or defined by fire brick 132, such that cooked food may be positioned within warming compartment 134 keep it warm while the remainder of the cooking is being completed.

Optionally, wood burning grill 100 may further include a firebox 136 positioned adjacent to coal support platform 126. In general, firebox 136 may be configured for receiving wood that is ignited and burned to form coals. For instance, firebox 136 may include a support rack 138 that is bent to form a trough for receiving wood. Additionally or alternatively, support rack 138 may include one or more apertures for permitting coals to burn off of wood and fall onto coal support platform 126. Once coals are on coal support platform 126, they may be moved forward and spread out (e.g., with a coal rake or other tool) to facilitate a cooking process.

As illustrated, wood burning grill 100 may further include one or more adjustable (e.g., cooking) racks 142. When assembled, racks 142 may be positioned above coal support platform 126 along the vertical direction V. Moreover, racks 142 may define a cooking surface 144 for supporting food items (not shown) during a cooking or grilling process. Notably, as explained briefly above, the vertical position of the rack 142 relative to the coals may be important in determining how a food item is cooked. In this regard, if rack 142 is too close to coals, the food items may burn or cook too quickly. By contrast, if the rack 142 is too far away from coals, food items may remain undercooked or cook to slowly. As result, aspects of the present subject matter are directed to a system for adjusting a vertical position of the rack 142 relative to the coal support platform 126.

Specifically, referring now also to FIGS. 2 through 7, wood burning grill may include a rack positioning assembly 150 that mechanically couples a rack 142 to cabinet 102 or another structure of wood burning grill 100 and is generally configured for moving a rack 142 between a raised position (e.g., as shown in FIG. 2, left side) and a lowered position (e.g., as shown in FIG. 2, right side). Specifically, rack positioning assembly 150 may be configured for moving rack 142 to any suitable position between the raised and lowered position (e.g., between a first travel limit and a second travel limit). For instance, movement between the raised and lowered positions may be vertical movement in the range of 6 inches, 12 inches, 24 inches, or greater. Although an exemplary rack positioning system 150 is described below to facilitate explanation of aspects of the present subject matter, it should be appreciated that the scope of the present disclosure is not limited to the embodiment described. Indeed, variations and modifications may be made to rack positioning assembly 150 while remaining within the scope of the present subject matter.

In general, rack positioning assembly 150 generally includes a linkage arm system 152 that mechanically couples rack 142 to the cabinet 102. In addition, a driven gear 154 may be operably coupled to linkage arm system 152 and may be rotatable to move rack 142 between the raised position and the lowered position. It should be appreciated that according to exemplary embodiments, any suitable linkage arm system that mechanically couples rack 142 to cabinet 102 may be used. Nonetheless, according to the illustrated embodiments, linkage arm system 152 includes one or more four-bar linkages 156. More specifically, a system of four-bar linkages 156 are used to support each rack 142. In this regard, the illustrated embodiments include two racks 142 position laterally side-by-side, with four total four-bar linkages 156 supporting the racks 142. In this regard, each rack 142 may be supported on each of its sides 158 by a four-bar linkage 156. An exemplary four-bar linkage 156 will be described below, but variations and modifications may be made to four-bar linkage 156 while remaining within scope the present disclosure.

Specifically, as illustrated, four-bar linkage 156 includes a primary drive arm 160 that is mechanically coupled to driven gear 154 such that drive arm 160 rotates with driven gear 154. Specifically, drive arm 160 may extend from a first pivot end 166 at the adjustable rack 142 to a second pivot end 168 at a driven rod 170. When assembled, primary drive arm 160 may be fixedly attached to driven rod 170 (i.e., at second pivot end 168) to rotate therewith while being rotatably attached to adjustable rack 142 (i.e., at first pivot end 166) to rotate relative to the same. In addition, four-bar linkage 156 includes a secondary support arm 162 that is rotatably mounted to cabinet 102 and rack 142 for maintaining the rack 142 in a substantially horizontal orientation (e.g., as defined by the lateral direction L and the transverse direction T) while rack 142 is moving between the raised position and the lowered position. Specifically, support arm 162 may extend from a first pivot end 166 at the adjustable rack 142 to a second pivot end 168 at an idler pin 169. When assembled, secondary support arm 162 may be rotatably attached to both driven rod 170 (i.e., at second pivot end 168) and adjustable rack 142 (i.e., at first pivot end 166) to rotate relative to the same while maintaining rack 142 is a substantially horizontal orientation.

Thus, as illustrated, the "four bars" of the four-bar linkage 156 may include drive arm 160, support arm 162, the section of rack 142 that extends between the pivot points where drive arm 160 and support arm 162 engage racks 142, and the section of cabinet 102 or some other support structure coupled to cabinet 102 that extends between the opposite ends of drive arm 160 and support arm 162.

According to the illustrated embodiment, in order to facilitate independent movement of the two racks 142, rack positioning assembly 150 may include a central support 164 that is mounted to a rear 114 of cabinet 102 at a center point along the lateral direction L. Central support 164 may be configured for rotatably supporting drive arms 160 and support arms 162 of the two innermost four-bar linkages 156. Notably, all drive arms 160 and support arms 162 are illustrated as being mounted proximate to rear 114 of cabinet 102, such that racks 142 are cantilevered over coal support platform 126. Notably, such positioning may facilitate easy coal management below racks 142.

Figure 5:
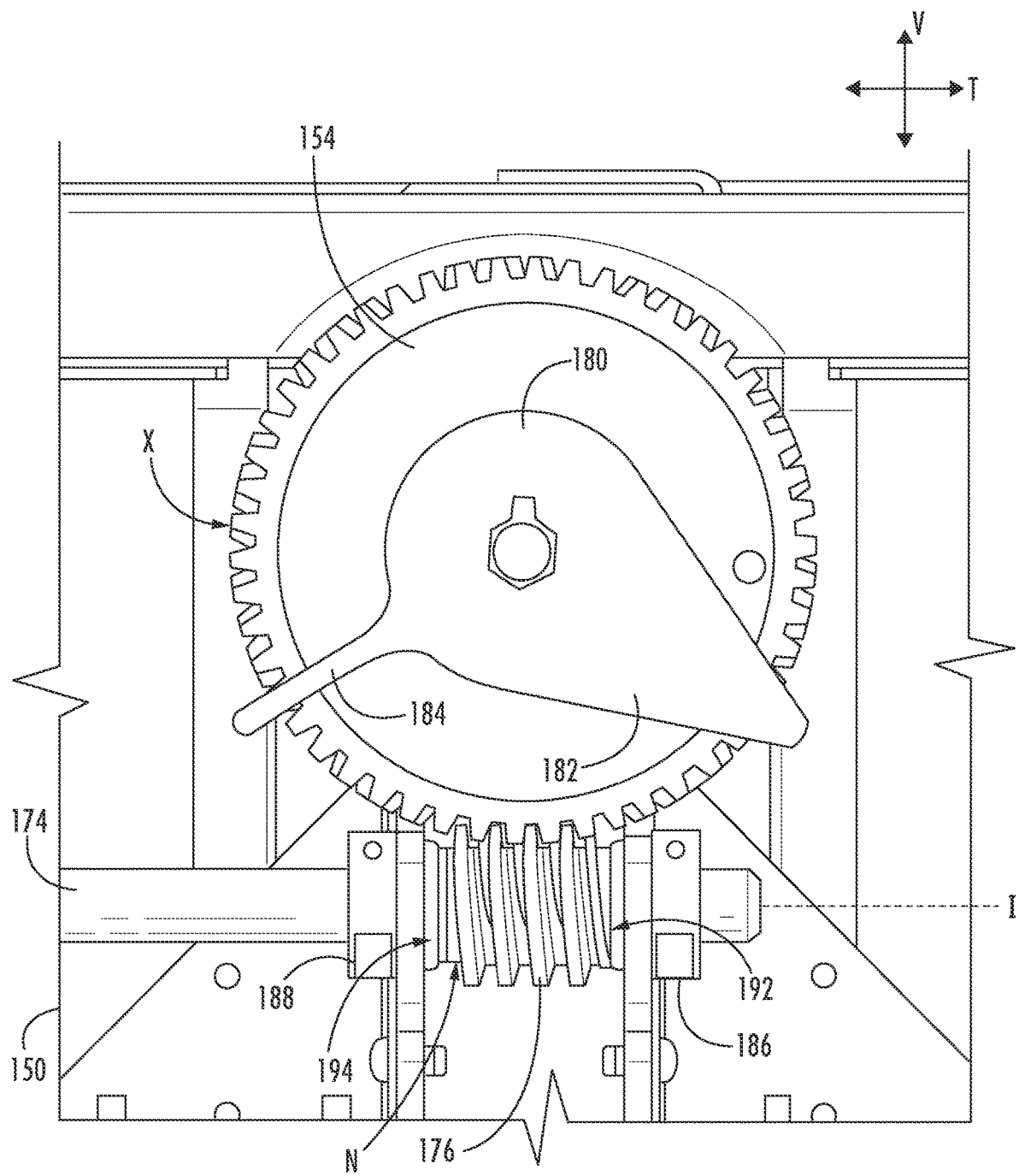
FIG. 5 provides a side elevation view of a portion of rack assembly of the exemplary wood burning grill of FIG. 1.
Figure 6:
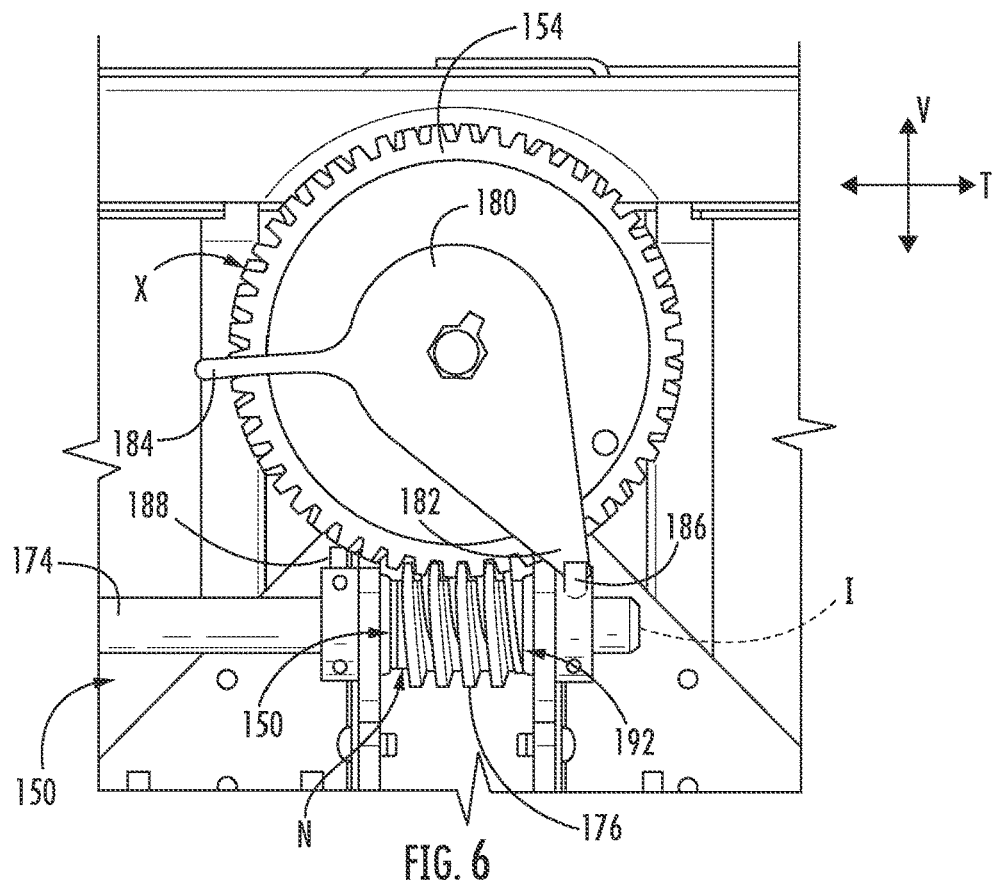
FIG. 6 provides a side elevation view of the exemplary rack assembly of FIG. 5 in a first travel limit.
Figure 7:
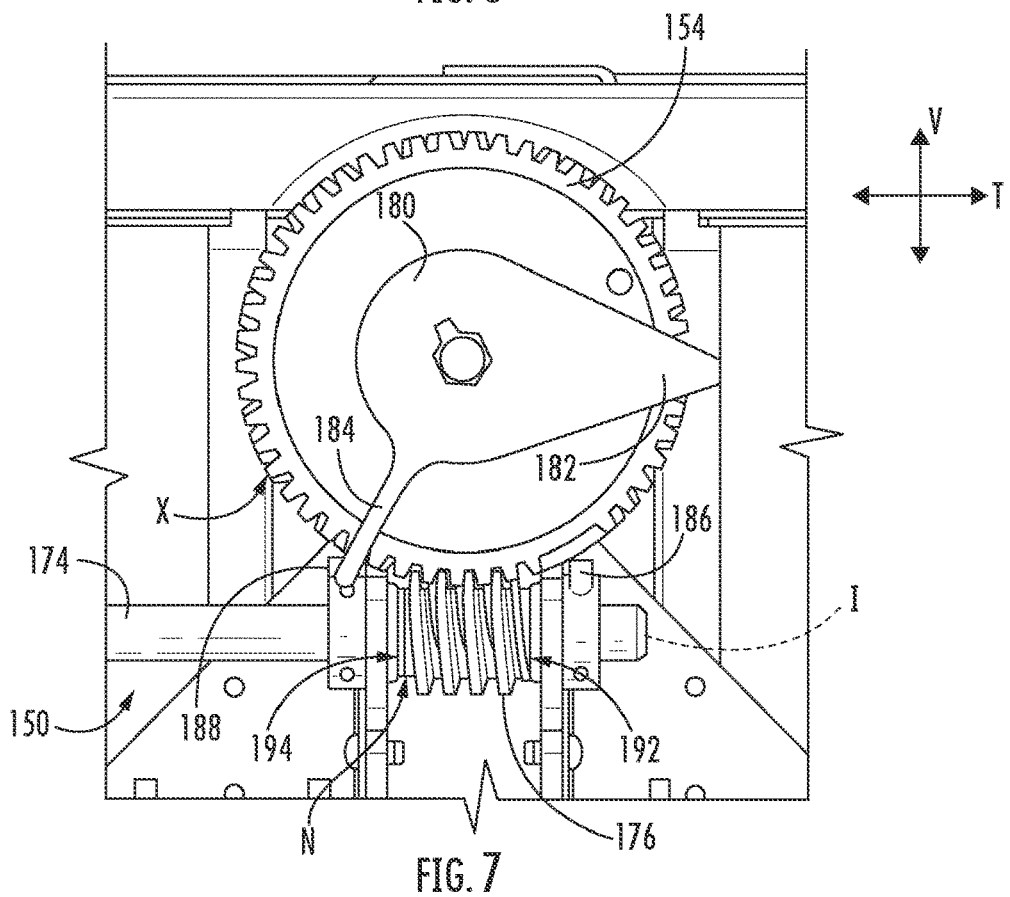
FIG. 7 provides a side elevation view of the exemplary rack assembly of FIG. 5 in a second travel limit.
Figure 8:
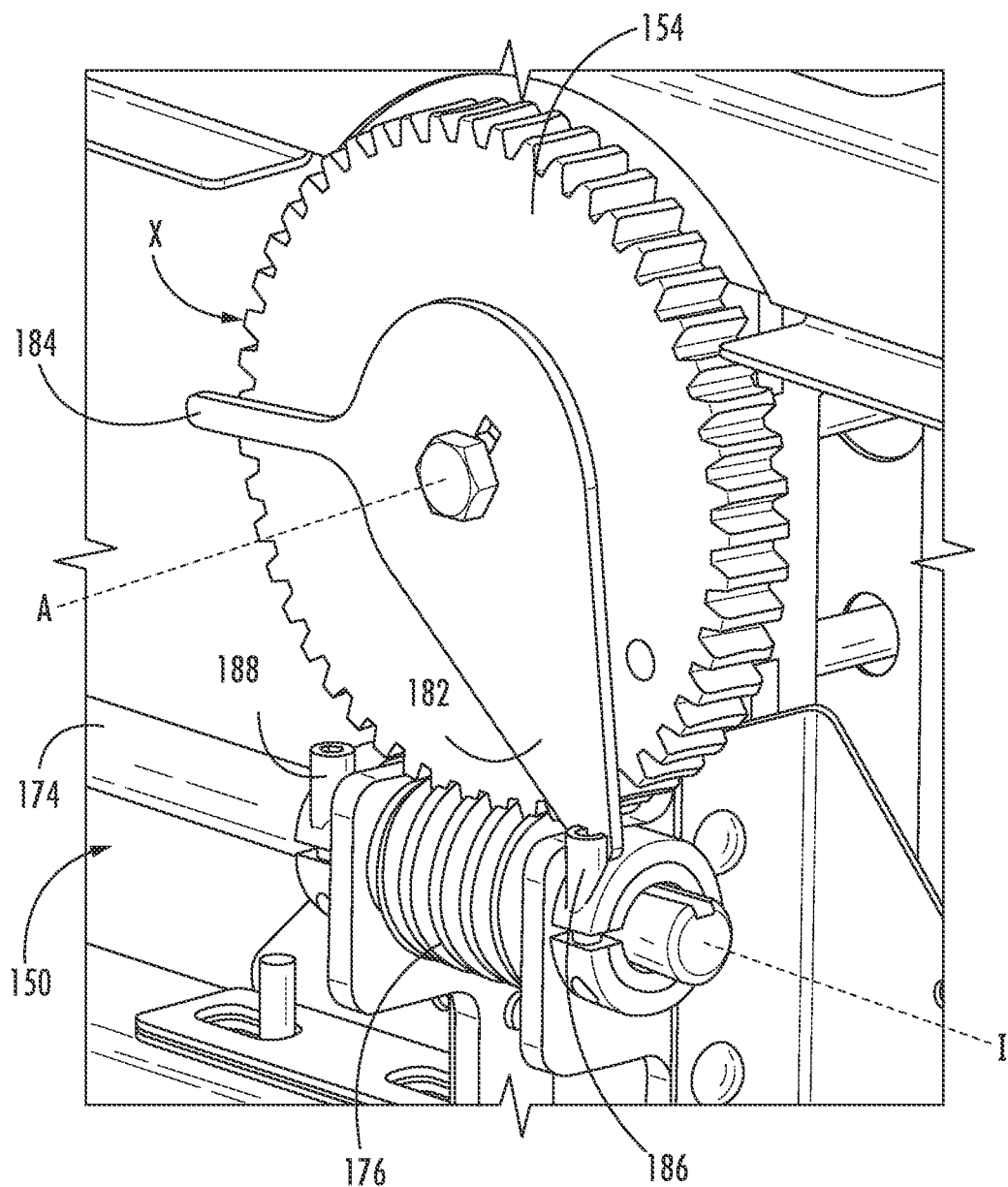
FIG. 8 provides a perspective view of the exemplary rack assembly of FIG. 5 in the first travel limit.

As generally shown in FIGS. 3 through 8, driven gear 154 may be coupled to drive arms 160 of four-bar linkages 156 using a driven rod 170 that extends substantially along the lateral direction L (e.g., such that driven rod 170 is mounted coaxially with driven gear 154). When assembled, driven rod 170 may rotatably couple drive arms 160 of each four-bar linkage 156 supporting a single rack 142. In this manner, four-bar linkages 156 on each side of a rack 142 may rotate in unison (e.g., to maintain a horizontal orientation of racks 142). In this regard, driven gear 154 may be rotatably mounted to cabinet 102 such that it rotates about the lateral direction L and is directly coupled to driven rod 170. Thus, when viewed as shown in FIG. 5, rotating driven gear 154 in the clockwise direction will raise rack 142, thereby increasing the distance between coal support platform 126 and cooking surface 144. By contrast, rotating driven gear 154 in the counterclockwise direction will lower racks 142, thereby decreasing the distance between coal support platform 126 and cooking surface 144.

In some embodiments, driven gear 154 is positioned proximate to rear 114 of cabinet 102 (i.e., away from a location where a user would typically stand). As a result, it may be desirable to provide easier access or control to driven gear 154 by a user standing at a front 112 of wood burning grill 100. Additionally or alternatively, it may be advantageous to magnify a user's work or input to raise or lower adjustable rack 142.

According to exemplary embodiments of the present disclosure, rack positioning assembly 150 includes an input shaft 174 that is in mechanical communication with driven gear 154. In particular, input shaft 174 may be rotatably attached to cabinet 102 while extending along an input axis I about which input shaft 174 rotates. Optionally, the input axis I may be parallel to the transverse direction T (e.g., such that input shaft 174 generally extends along and rotates about transverse direction T). Along the input axis I, input shaft 174 may include a worm gear or worm gear segment 176. Thus, the worm gear segment 176 extends between a first end 192 and a second end 194 to define or occupy a sub-portion of input shaft 174 along the input axis I. Specifically, worm gear segment 176 defines an axial length that is less than the axial length of the overall input shaft 174.

When assembled, the worm gear segment 176 is enmeshed with the driven gear 154 to move therewith. Moreover, driven gear 154 is rotatable about a driven axis A (e.g., parallel to the lateral direction L) that is nonparallel or perpendicular to input axis I. Thus, the gear teeth of the driven gear 154 may be received within and driven by nonparallel (e.g., perpendicular) rotation of the worm gear segment 176, as would be generally understood. Optionally, the worm gear segment 176 and the driven gear 154 define a gearing ratio of the worm gear segment 176 to the driven gear 154 greater than 1:1. In turn, a single 360° rotation of the input shaft 174 about the input axis I may prompt rotation of the driven gear 154 that is less than 360° about the driven axis A. Advantageously, a user may be able to make relatively precise adjustments to the height of cooking rack 142 while expending relatively little effort with each rotation of input shaft 174.

In certain embodiments, an interference plate 180 is fixed to the driven gear 154 (e.g., wherein interference plate 180 is separately attached to or integrally formed with driven gear 154) and thus rotates therewith about driven axis A. Generally, interference plate 180 includes one or more radial lobes or arms (e.g., first radial arm 182 or second radial arm 184) that are disposed in front of or behind the driven gear 154 (e.g., against an outer face of driven gear 154). In some such embodiments, worm gear segment 176 is disposed between a first radial arm 182 and a second radial arm 184. Specifically, the radial arms 182, 184 may be circumferentially spaced apart from each other. During use, the gear teeth between the first and second radial arms 182, 184 may be the only gear teeth engaged by worm gear segment 176.

As would be understood, the driven gear 154 and its gear teeth define a maximum outer circumference X (i.e., at the radial tip of the gear teeth) and a minimum outer circumference (i.e., at the base of the gear teeth). The radial arm(s) of interference plate 180 may extend radially outward from driven axis A past the maximum outer circumference X.

One or more contact tabs 186, 188 may be provided on input shaft 174 to selectively engage a corresponding radial arm 182, 184. Generally, such contact tabs 186, 188 extend radially outward and may extend beyond a minimum outer circumference N of worm gear segment 176. For instance, a contact tab 186, 188 may extend from a retention collar provided on or as part of input shaft 174. Optionally, each of a pair of contact tabs 186, 188 may be disposed on opposite axial ends of worm gear segment 176 such that worm gear segment 176 is bounded along the input axis I by the contact tabs 186, 188.

As shown, a first contact tab 186 may extend from input shaft 174 to selectively engage first radial arm 182. First contact tab 186 may extend radially or nonparallel to input axis I outward from input shaft 174. Moreover, first contact tab 186 may be rotationally fixed to input shaft 174 (e.g., at or proximal to first end 192, and thus distal to second end 194). Thus, first contact tab 186 may be rotated with input shaft 174 about input axis I until a first predefined travel limit is reached. As illustrated especially in FIG. 6, the first predefined travel limit may provide the first contact tab 186 in contact with first radial arm 182 such that further counterclockwise rotation of the input shaft 174 (e.g., as defined by a user facing grill 100 at front 112) is directly prevented. Advantageously, the first predefined limit may restrict rotation of input shaft 174 directly (e.g., without requiring force to transfer through one or more intermediate gears). Additionally or alternatively, the first predefined limit may be felt as a "hard stop" by a user and not confused with general friction or resistance by a rack assembly that can be overcome to further raise or lower rack 142. Separate from or in addition to first contact tab 186, a second contact tab 188 may extend from input shaft 174 to selectively engage second radial arm 184. Second contact tab 188 may extend radially or nonparallel to input axis I outward from input shaft 174. Moreover, second contact tab 188 may be rotationally fixed to input shaft 174 (e.g., at or proximal to second end 194, and thus distal to first end 192). Thus, second contact tab 188 may be rotated with input shaft 174 about input axis I until a second predefined travel limit is reached. As illustrated especially in FIG. 8, the second predefined travel limit may provide the second contact tab 188 in contact with second radial arm 184 such that further clockwise rotation of the input shaft 174 (e.g., as defined by a user facing grill 100 at front 112) is directly prevented. Advantageously, the second predefined limit may restrict rotation of input shaft 174 directly (e.g., without requiring force to transfer through one or more intermediate gears). Additionally or alternatively, the second predefined limit may be felt as a "hard stop" by a user and not confused with general friction or resistance by a rack assembly that can be overcome to further raise or lower rack 142.

According to exemplary embodiments of the present disclosure, rack positioning assembly 150 further includes a hand wheel 172 that is rotatably mounted to cabinet 102 (e.g., at front 112). Hand wheel 172 may be coupled to driven gear 154 by input shaft 174 and a worm gear 176. As shown, hand wheel 172 and input shaft 174 may generally be aligned with and rotate about the transverse direction T. More specifically, input shaft 174 may extend between hand wheel 172 and driven gear 154, while worm gear 176 may mechanically couple input shaft 174 to driven gear 154 such that rotating hand wheel 172 rotates driven gear 154 to raise and lower racks 142. Notably, worm gear 176 may generally be configured as a self-locking gear such that worm gear 176 and driven gear 154 only rotate when hand wheel 172 initiates such rotation. Thus, when a user removes their hand from hand wheel 172, rack 142 may remain in a fixed vertical position. It should be appreciated that cabinet 102 may include a cover 178 that is generally positionable over the working components of rack positioning assembly 150. In this manner, when cover 178 is positioned on cabinet 102, rack positioning assembly 150 may be concealed with the exception of hand wheel 172.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A movable rack assembly comprising:
an input shaft extending along an input axis to rotate thereabout, the input shaft comprising a worm gear segment disposed along the input axis between a first end and a second end;
a driven gear enmeshed with the worm gear segment, the driven gear defining a maximum outer circumference and being rotatable about a driven axis nonparallel to the input axis;
an adjustable rack in mechanical communication with the driven gear to move therewith;
an interference plate fixed to the driven gear to rotate therewith about the driven axis, the interference plate comprising a radial arm extending past the maximum outer circumference of the driven gear; and
a contact tab extending from the input shaft to rotate therewith about the input axis, the contact tab being axially offset from the worm gear segment in selective engagement with the radial arm at a predefined travel limit of the driven gear to halt rotation at the input shaft, the contact tab extending radially relative to the input axis at a location radially offset from the input axis to engage an axial face of the radial arm.

2. The movable rack assembly of claim 1, wherein the radial arm is a first radial arm, and wherein the interference plate further comprises a second radial arm extending past the maximum outer circumference of the driven gear, the second radial arm being circumferentially spaced apart of the first radial arm.

3. The movable rack assembly of claim 2, wherein the predefined travel limit is a first travel limit relative to a first rotational direction about the input axis, wherein the contact tab is a first contact tab, and wherein the movable rack assembly further comprises a second contact tab axially offset from the worm gear segment in selective engagement with the second radial arm at a second travel limit of the driven gear relative to a second rotational direction opposite to the first rotational direction about the input axis.

4. The movable rack assembly of claim 3, wherein the first contact tab is disposed proximal to the first end, and wherein the second contact tab is disposed proximal to the second end such that the worm gear segment is disposed along the input axis between the first contact tab and the second contact tab.

5. The movable rack assembly of claim 1, wherein the worm gear segment and the driven gear define a gearing ratio of the worm gear segment to the driven gear greater than 1:1.

6. The movable rack assembly of claim 1, wherein the worm gear segment defines a minimum outer circumference, and wherein the contact tab extends past the minimum outer circumference of the worm gear segment.

7. The movable rack assembly of claim 1, further comprising a driven rod mounted coaxially with the driven gear.

8. The movable rack assembly of claim 7, further comprising a primary drive arm fixed to the driven rod to rotate therewith about the driven axis, the primary drive arm extending from a first pivot end at the adjustable rack to a second pivot end at the driven rod.

9. The movable rack assembly of claim 8, further comprising a secondary support bar extending from a first pivot end at the adjustable rack to second pivot end at an idler pin spaced apart from the driven rod.

10. The movable rack assembly of claim 1, further comprising a hand wheel rotationally fixed to the input shaft to rotate therewith about the input axis.

11. A movable rack assembly for a wood burning grill comprising:
an input shaft extending along an input axis to rotate thereabout, the input shaft comprising a worm gear segment disposed along the input axis between a first end and a second end;
a hand wheel rotationally fixed to the input shaft to rotate therewith about the input axis;
a driven gear enmeshed with the worm gear segment, the driven gear defining a maximum outer circumference and being rotatable about a driven axis nonparallel to the input axis;
an adjustable rack in mechanical communication with the driven gear to move therewith;
an interference plate fixed to the driven gear to rotate therewith about the driven axis, the interference plate comprising a radial arm extending past the maximum outer circumference of the driven gear; and
a contact tab extending from the input shaft to rotate therewith about the input axis, the contact tab being axially offset from the worm gear segment in selective engagement with the radial arm at a predefined travel limit of the driven gear to halt rotation at the input shaft, the contact tab extending radially relative to the input axis at a location radially offset from the input axis to engage an axial face of the radial arm,
wherein the worm gear segment and the driven gear define a gearing ratio of the worm gear segment to the driven gear greater than 1:1.

12. The movable rack assembly of claim 11, wherein the radial arm is a first radial arm, and wherein the interference plate further comprises a second radial arm extending past the maximum outer circumference of the driven gear, the second radial arm being circumferentially spaced apart of the first radial arm.

13. The movable rack assembly of claim 12, wherein the predefined travel limit is a first travel limit relative to a first rotational direction about the input axis, wherein the contact tab is a first contact tab, and wherein the movable rack assembly further comprises a second contact tab axially offset from the worm gear segment in selective engagement with the second radial arm at a second travel limit of the driven gear relative to a second rotational direction opposite to the first rotational direction about the input axis.

14. The movable rack assembly of claim 13, wherein the first contact tab is disposed proximal to the first end, and wherein the second contact tab is disposed proximal to the second end such that the worm gear segment is disposed along the input axis between the first contact tab and the second contact tab.

15. The movable rack assembly of claim 11, wherein the worm gear segment defines a minimum outer circumference, and wherein the contact tab extends past the minimum outer circumference of the worm gear segment.

16. The movable rack assembly of claim 11, further comprising a driven rod mounted coaxially with the driven gear.

17. The movable rack assembly of claim 16, further comprising a primary drive arm fixed to the driven rod to rotate therewith about the driven axis, the primary drive arm extending from a first pivot end at the adjustable rack to a second pivot end at the driven rod.

18. The movable rack assembly of claim 17, further comprising a secondary support bar extending from a first pivot end at the adjustable rack to second pivot end at an idler pin spaced apart from the driven rod.

19. A movable rack assembly for a wood burning grill comprising:
- an input shaft extending along an input axis to rotate thereabout, the input shaft comprising a worm gear segment disposed along the input axis between a first end and a second end;
- a hand wheel rotationally fixed to the input shaft to rotate therewith about the input axis;
- a driven gear enmeshed with the worm gear segment, the driven gear defining a maximum outer circumference and being rotatable about a driven axis nonparallel to the input axis;
- an adjustable rack in mechanical communication with the driven gear to move therewith;
- an interference plate fixed to the driven gear to rotate therewith about the driven axis, the interference plate comprising a radial arm extending past the maximum outer circumference of the driven gear;
- a contact tab extending from the input shaft to rotate therewith about the input axis, the contact tab being axially offset from the worm gear segment in selective engagement with the radial arm at a predefined travel limit of the driven gear to halt rotation at the input shaft, the contact tab extending radially relative to the input axis at a location radially offset from the input axis to engage an axial face of the radial arm;
- a driven rod mounted coaxially with the driven gear;
- a primary drive arm fixed to the driven rod to rotate therewith about the driven axis, the primary drive arm extending from a first pivot end at the adjustable rack to a second pivot end at the driven rod; and
- a secondary support bar extending from a first pivot end at the adjustable rack to second pivot end at an idler pin spaced apart from the driven rod,
- wherein the worm gear segment and the driven gear define a gearing ratio of the worm gear segment to the driven gear greater than 1:1,
- wherein the radial arm is a first radial arm, and wherein the interference plate further comprises a second radial arm extending past the maximum outer circumference of the driven gear, the second radial arm being circumferentially spaced apart of the first radial arm,
- wherein the worm gear segment defines a minimum outer circumference, and
- wherein the contact tab extends past the minimum outer circumference of the worm gear segment.

20. The movable rack assembly of claim 19, wherein the predefined travel limit is a first travel limit relative to a first rotational direction about the input axis,
- wherein the contact tab is a first contact tab,
- wherein the movable rack assembly further comprises a second contact tab axially offset from the worm gear segment in selective engagement with the second radial arm at a second travel limit of the driven gear relative to a second rotational direction opposite to the first rotational direction about the input axis,
- wherein the first contact tab is disposed proximal to the first end, and
- wherein the second contact tab is disposed proximal to the second end such that the worm gear segment is disposed along the input axis between the first contact tab and the second contact tab.

* * * * *